Nov. 2, 1971  R. W. BLACK  3,616,534
BOBBIN LUGGER
Filed Nov. 18, 1969  6 Sheets-Sheet 1

INVENTOR.
RICHARD W. BLACK
BY
ATTORNEYS

Nov. 2, 1971          R. W. BLACK          3,616,534
                       BOBBIN LUGGER

Filed Nov. 18, 1969                    6 Sheets-Sheet 2

INVENTOR.
RICHARD W. BLACK
BY
ATTORNEYS

INVENTOR.
RICHARD W. BLACK

BY

ATTORNEYS

Nov. 2, 1971  R. W. BLACK  3,616,534
BOBBIN LUGGER
Filed Nov. 18, 1969  6 Sheets-Sheet 4

INVENTOR.
RICHARD W. BLACK
BY
ATTORNEYS

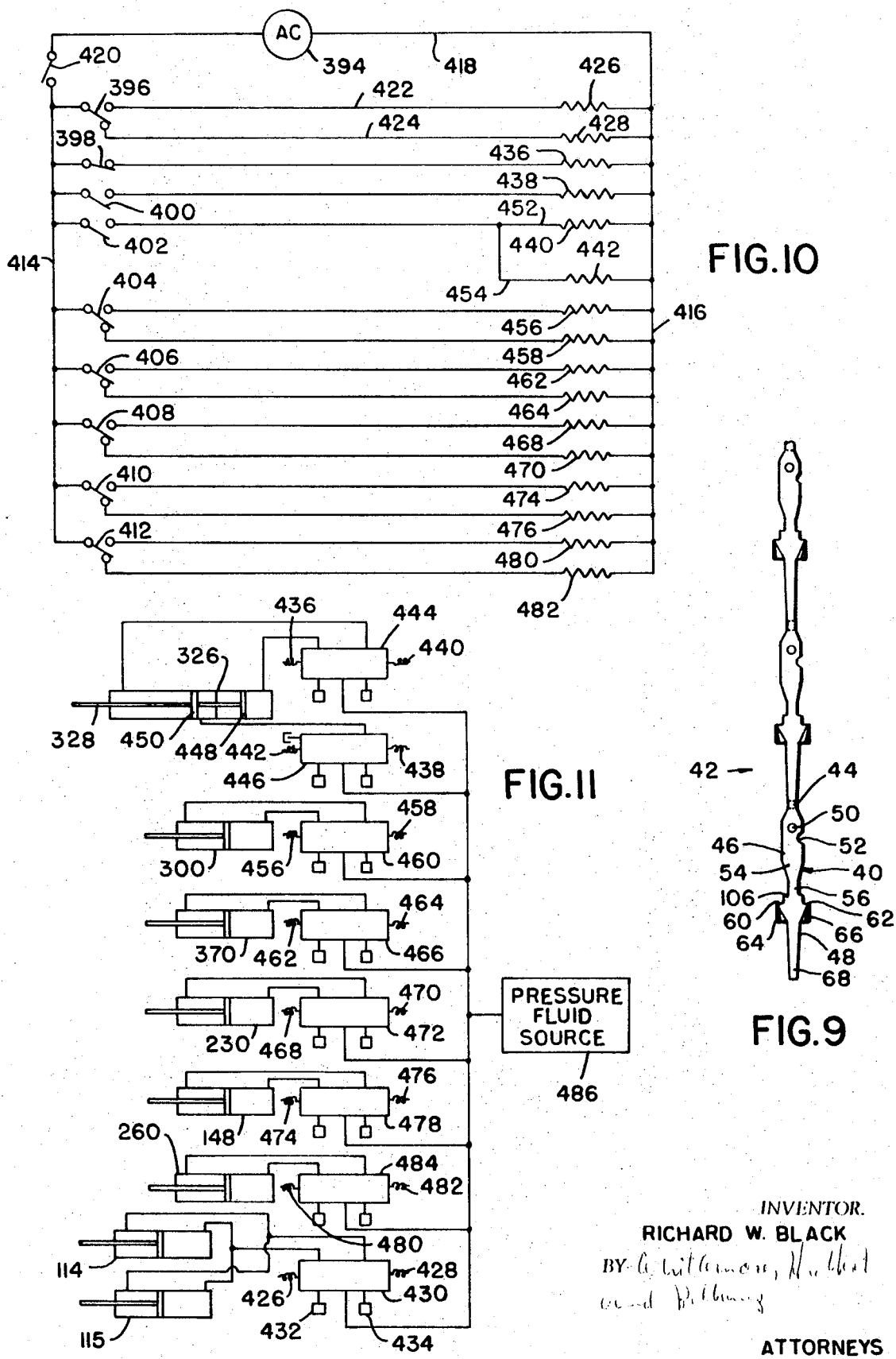

Nov. 2, 1971   R. W. BLACK   3,616,534
BOBBIN LUGGER

Filed Nov. 18, 1969   6 Sheets-Sheet 6

INVENTOR.
RICHARD W. BLACK
BY
*Whittemore, Hulbert &*
*Belknap*
ATTORNEYS

United States Patent Office 3,616,534
Patented Nov. 2, 1971

3,616,534
BOBBIN LUGGER
Richard W. Black, Manchester, Pa., assignor to Berg Electronics, Inc., New Cumberland, Pa.
Filed Nov. 18, 1969, Ser. No. 877,621
Int. Cl. H05k 3/30, 13/04; H01r 43/04
U.S. Cl. 29—626
23 Claims

ABSTRACT OF THE DISCLOSURE

The bobbin lugger of the invention is adapted to simultaneously lug a plurality of electrical terminals to a bobbin structure. In the embodiment illustrated, six separate terminal strips are fed into a terminal feed structure. Individual terminals are severed from each strip and gravity fed into positioning means which are aligned with openings of a bobbin. After being located by the positioning means, the terminals are held in place by clamping means and the positioning means are retracted to expose a portion of each terminal for insertion through openings in the bobbin. The bobbins are individually loaded onto an elevator structure which is positioned beneath the clamped terminals. The elevator structure carries the bobbins up to the terminals. A portion of the terminals is then bent over onto a bobbin surface and the bobbins are then retracted and ejected from the apparatus whereupon the sequence is repeated.

BACKGROUND OF THE INVENTION

Plastic bobbins with metal lugs attached have come into widespread use in the electronics industry for establishing electrical connections. The lugs, for example, may be of the type for attachment to circuit boards or may be of the type to which circuit leads are directly soldered. The bobbin usually includes a coil for winding of the lead wires thereon.

Mass production of lugged bobbins has presented a number of problems. It is desirable to automatically apply the terminals to the bobbin. However, the small size and close tolerances of the bobbins and final product have created problems in automating the lugging operation. Prior art machines have, in general, been relatively slow in operation and it has been difficult with such machines to simultaneously mount a plurality of terminals onto a bobbin.

The present invention provides a bobbin lugging apparatus which is capable of rapidly and simultaneously mounting a plurality of terminals onto a bobbin without requiring various indexing structures to orient the bobbin or the terminals once a sequence of operation has been begun. Additionally, the apparatus is capable of being converted, by substitution of a limited number of components, to receive and act on bobbins and terminals of varying dimensions and sizes.

SUMMARY OF THE INVENTION

A bobbin lugger for mounting a plurality of terminals on a bobbin having a plurality of terminal receiving openings is provided. The lugger comprises means for feeding a plurality of chain forms of terminals thereinto. Means are provided for severing terminals, one at a time, from the chain forms. A terminal positioning structure is provided for aligning the severed terminals in a position for insertion into the openings of a bobbin. The apparatus includes means for advancing severed terminals to the terminal positioning structure and means for clamping one end of the terminals while the terminals are in the terminal positioning structure. The terminal positioning structure is removed after clamping to expose a portion of the terminals. Structures is provided for moving a bobbin onto the clamped terminals whereby the exposed portions thereof will extend through the bobbin openings with a section extending out of the bobbin openings. Finally, means are provided to bend the exposed sections to lock the terminals onto the bobbin whereupon the bobbin is retracted and the cycle may be repeated.

In the drawings:

FIG. 9 is a plan view of a strip of terminals utilized in the bobbin lugger;

FIG. 10 is an electrical schematic of the control circuit for the bobbin lugger;

FIG. 11 is a pneumatic schematic of the pneumatic power system utilized to actuate the bobbin lugger mechanisms;

Figure 7:
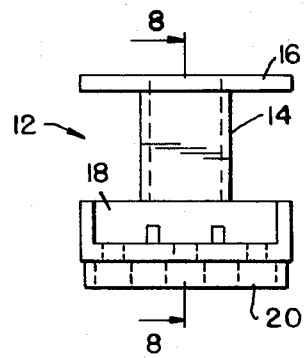
FIG. 7 is a front elevational view of a bobbin of the type which is lugged in accordance with the present invention.
Figure 8:
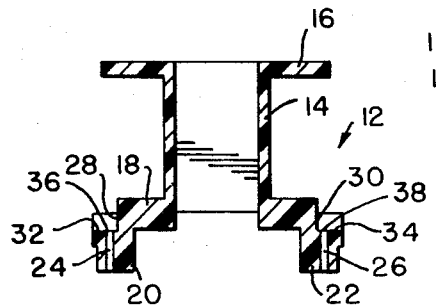
FIG. 8 is a sectional view of the bobbin taken substantially along the line 8—8 of FIG. 7 looking in the direction of the arrows.

The bobbin lugger 10 illustrated in the various figures is adapted to lug electrical terminals onto a bobbin structure of the type illustrated in FIGS. 7 and 8, the term "lugging" being the term applied to the process of physically attaching an electrical terminal to a bobbin. The bobbin 12 is fabricated of an electrically insulating material such as, for example, a plastic material such as nylon. The bobbin 12 comprises a central tubular cylindrical spool portion 14 for the winding of electrically conductive wires thereon. An upper flange structure 16 is provided to retain and protect the wires. Similar flange structure 18 is provided on the lower end of the spool portion.

Downwardly depending terminal receiving portions 20, 22 are provided on oppositely disposed portions of the flange structure 18. Spaced apart openings 24, 26 are provided through each terminal receiving portion 20, 22. Illustratively, three openings 24, 26 are provided in each terminal receiving portion thus totaling six openings for six terminals. It will be noted that a recess 28, 30 is defined by the outer edge of the flange structure 18 and the upper surface or shelf 32, 34 of the terminal receiving portions 20, 22.

A portion of each terminal extends through the openings. The upper portion of each terminal is bent over onto the shelves 32, 34, to extend at right angles to the openings 24, 26. Electrical wires are attached to the bent over portion of the terminals. Another portion of the terminal extends downwardly from the bottom of the spool to form prongs which may be received in, for example, sockets provided in a printed circuit structure. One of the problems posed in lugging terminals onto the bobbin 12 is the presence of the recesses 28, 30 which makes it difficult to wipe the terminals directly at the bending point or fulcrum 36, 38 of the openings 24, 26. The physical dimensions of the recesses effectively prevent insertion of a tool for wiping and bending.

In the above description of the bobbin 12, the terms "up" and "down" are used with reference to the position of the bobbin illustrated in FIGS. 7 and 8. It will, however, be appreciated that the terms are relative, the bobbin 12 being capable of use in many different positions wherein the location of the various bobbin portions may be reversed or modified from that shown in FIGS. 7 and 8.

FIG. 9 illustrates the type of electrical terminal 40 which is lugged into the bobbin 12. The terminals 40 are initially provided as a continuous strip 42. In operation of the bobbin lugger 10, the terminals 40 are sequentially severed from the strip 42 for lugging into the bobbin 12. A section of metal 44, indicated by the dotted lines, is blanked out at the rearward end of each terminal 44 during the severing process. Each terminal 40 comprises a portion 46 which is bent over on the surfaces 32 or 34 of the bobbin 12 and a portion 48 which extends through an opening 24, 26 of the bobbin.

The portion 46 is relatively wide and includes an opening 50 and a notch 52 on one edge for the attachment of an electrical lead. The forward portion 54 necks down to a section 56 of reduced width. The terminal is bent at the section 56, the reduced width of this section resulting in the desired bending when the portion 46 is wiped in a bending action at a point remote therefrom.

The portion 48 includes outwardly extending wings 60, 62 which engage the side walls of the bobbin openings in frictional engagement therewith. Each of the wings 60, 62 has a tang 64, 66 at approximately right angles thereto. The tangs 64, 66 engage an interior surface of a bobbin opening to mechanically position the terminal within the bobbin opening. A prong portion 68 extends from the wings 60, 62. The prong portion 68 passes through a bobbin opening and extends exteriorly thereof as previously described.

The bobbin lugger 10 may conveniently be subdivided into six portions as follows:

(1) Terminal feed and cut-off structure (70).
(2) Terminal positioning and clamping structure (72).
(3) Bobbin loading and elevating structure (74).
(4) Terminal bending structure (76).
(5) Bobbin retracting and ejecting structure (78).
(6) Control mechanism.

In operation of the bobbin lugger, six separate terminal strips 42 are fed into the terminal feed structure. Individual terminals are severed from the strips 42 as needed. These severed terminals are gravity fed into positioning means which are aligned with the openings in the bobbin. After being located by the positioning means, the terminals are held in place by clamping means whereupon the positioning means are removed to expose a portion of the terminals for insertion into the openings in the bobbin.

The bobbins are individually loaded onto an elevator structure which is positioned beneath the clamped terminals. The elevator structure carries the bobbins up to the terminals whereupon the rear portions 48 of the terminals are inserted into the bobbin openings. The forward portions 46 of the terminals are then bent over onto the bobbin surfaces 32, 34. The lugged bobbins are then retracted and ejected and the sequence is repeated.

TERMINAL FEED AND CUT-OFF STRUCTURE

Figure 4:
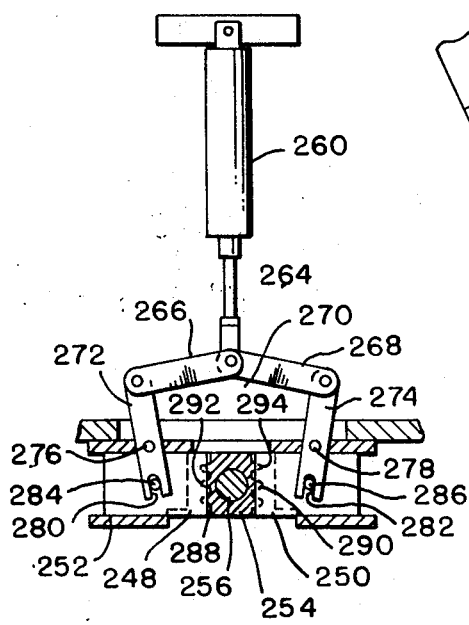
FIG. 4 is a sectional view of the terminal clamping structure taken substantially along the line 4—4 of FIG. 1 looking in the direction of the arrows.
Figure 1:
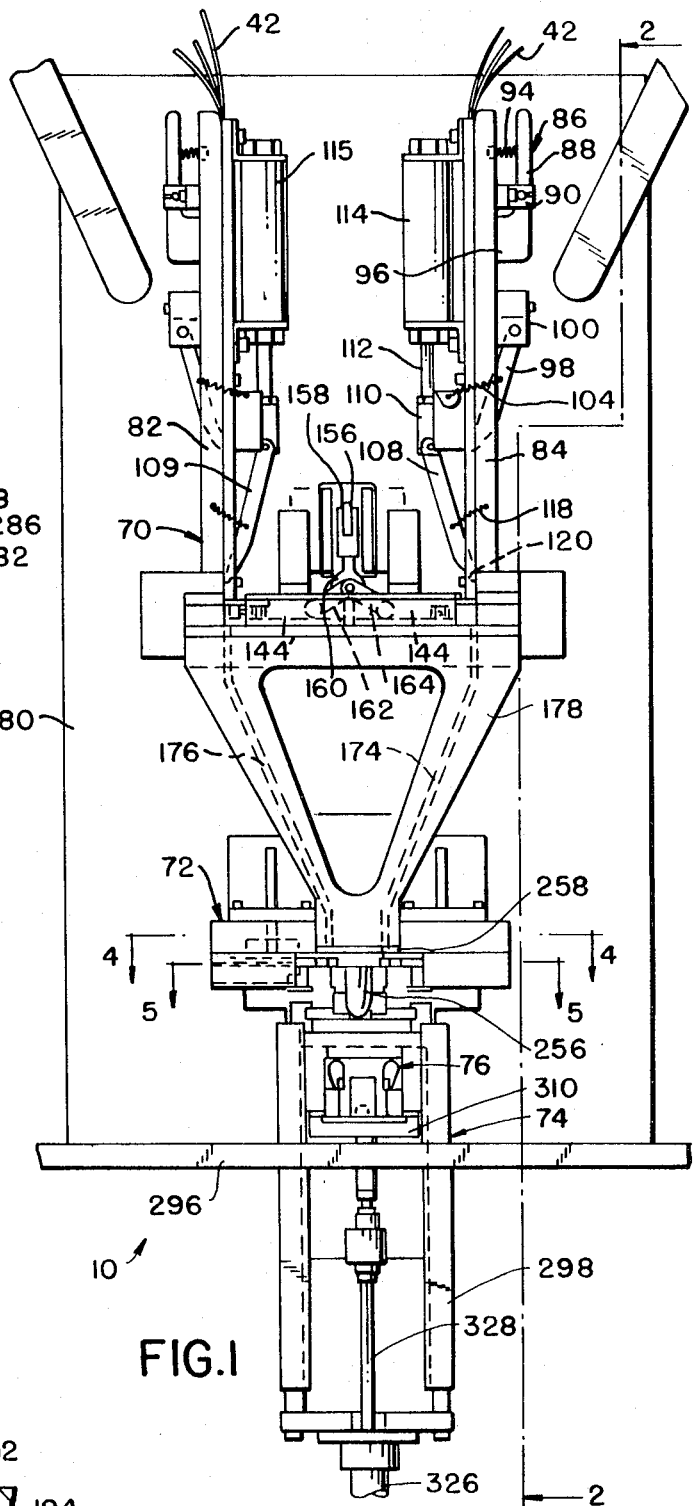
FIG. 1 is a front elevational view of a bobbin lugger forming one embodiment of the present invention.
Figure 2:
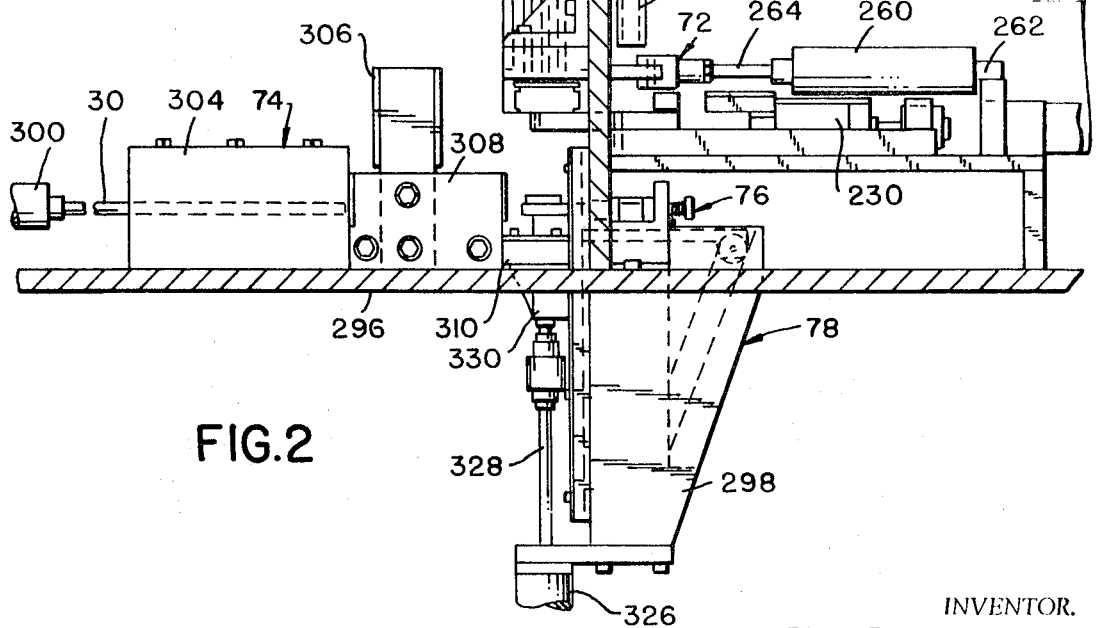
FIG. 2 is a vertical sectional view of the bobbin lugger taken substantially along the line 2—2 of FIG. 1 looking in the direction of the arrows.
Figure 3:
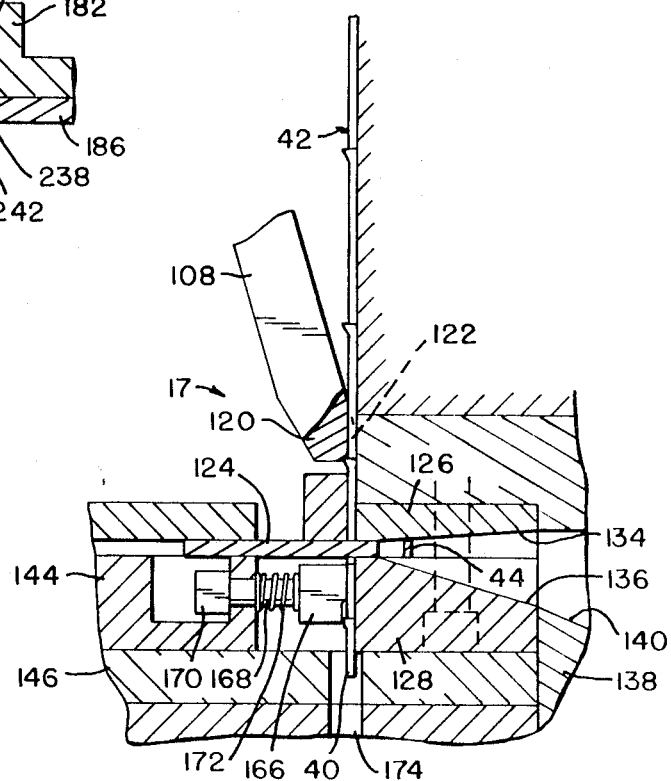
FIG. 3 is a sectional view of the terminal feed and cutoff structure taken substantially along the line 3—3 of FIG. 2 looking in the direction of the arrows.

The terminal feed and cut-off structure 70 is best illustrated in FIGS. 1, 2 and 3. As will be noted, a vertical support plate 80 is provided for mounting of most of the components of the bobbin lugger. The terminal feed structure is mounted on the upper portion of the plate 80. A pair of terminal strip guide structures 82, 84 are mounted in vertically spaced apart parallel relationship on the plate 80. The guide structures 82, 84 each have three spaced apart internal guide tracks each of which receives one terminal strip 42. The terminal strips are conveniently fed from reels (not shown) provided adjacent to the bobbin luggers.

A frictional drag mechanism is provided adjacent to the upper end of the guide structures 82, 84 to frictionally restrain the terminal strips 42 and prevent inadvertent movement of the strips into the guide structures. Three L-shaped terminal drag members 86 are provided for each guide structure 82, 84. The long arm 88 of the drag members 86 is pivotally mounted intermediate its ends in a drag mounting block 90 which is secured to the wall 92 of the guide structure. A coil spring 94 is provided, above the pivotal connection, between the arm 88 and wall 92. The spring 94 exerts an outward force on the arm 88 tending to pivot the enlarged lower portion 96 into the guide structure. As will be noted in FIG. 2, openings are provided in the wall 92 through which the enlarged portions 96 extend into contact with the terminal strips 42 to exert the desired frictional drag thereon.

A back latch structure is provided beneath each terminal drag structure. The function of the back latch structure is to prevent inadvertent movement of the terminal strips out of the guide structures 82, 84 during the severing and feeding operations. The back latch structures each include a pivotally mounted back latch finger 98 on each guide structure 82, 84. The fingers 98 are pivotally mounted at the upper end thereof in a back latch mounting block 100 which is secured to the guide structure wall 92. The lower end of the back latch finger 98 extends through an opening 102 into the guide structure. A coil spring 104 biases the fingers towards the terminal strips 42. Each of the fingers includes three spaced apart notches (not shown) for engagement with (referring to FIG. 9) tangs 64, 66. This permits the feeding of the terminal strips downwardly but positively prevents upward movement of the terminal strips.

A terminal feeding structure is provided beneath each back latch structure. The terminal feeding structure includes a feed finger 108 which is structurally similar to the back latch finger 98. The feed fingers are pivotally mounted at the upper ends thereof on a support block 110 carried on the outer end of a piston rod 112 which is extendable and retractable in a pneumatic cylinder 114, 115. The cylinders 114, 115 are mounted on the guide structures.

A coil spring 118 extends between the guide structure and an intermediate point of the feed finger 108. The spring 118 biases the lower end of the feed finger into contact with the lower portion of the terminal strip. As will be noted in FIG. 3, the forward end 120 of the feed finger 108 is tapered and is provided with spaced apart notches 122 which engage the section 48 of the second terminal of the terminal strip, leaving the lower terminal free for cut off. After the lowermost terminal has been cut off, the cylinder 114 is actuated causing the piston rod 112 to be retracted. This carries the feed finger 108 upwardly to a point just above the section 48 of the next terminal. The cylinder 114 is then actuated to extend the piston rod 112 causing the feed finger to move downwardly and engage the section 48. Upon engagement thereof, further movement of the piston rod 112 causes the forwardmost terminal to be positioned for the cut-off operation.

As will be noted in FIG. 3, the cut-off mechanism includes a reciprocable cutting blade 124 and stationary upper and lower cutting blades 126, 128. The cutting edges of the blades 126, 128 are spaced apart substantially the thickness of the blade 124. This thickness equals the width of the terminal segment 44 to be blanked therefrom during the cut-off operation. Diverging interior surfaces 134, 136 are provided interiorly of the blades 126, 128 to form the first portion of an ejection chute for the segments 44. A block 138 is mounted adjacent to the blades 126, 128. The block 138 has an opening 140 therethrough which forms the remainder of the ejection chute. It will be noted that the lower surface of opening 140 diverges downwardly for gravity feed of the blanks therefrom.

The reciprocal cutting blade 124 is mounted on a slide element 144 which is slidingly received in a slide guide 146. The slide members 144 are reciprocated by means of a pneumatic cylinder 148 which, as will be noted in FIG. 2, is mounted on the rear surface of the plate 80. The piston rod 150 of the cylinder 148 is oriented vertically and reciprocates in an up and down motion. The outer end of the rod 150 is pivotally connected to a link 152. The link 152 extends through an opening in the plate 80 to a point just above the slide 144. The link 152 is pivotally mounted intermediate its ends on a bracket 154. As will be noted, the link 152 is angled slightly upwardly. Downward movement of the piston rod 150 results in upward movement of the forward end 156 of link 152 while upward movement of the rod results in downward movement of the end 156. A second clevis link 158 is pivotally mounted to the end 156 of link 152. The link 158 extends in a generally vertical direction. A ring 160 is provided at the lower end of the link 158. A pair of links 162, 164 are pivotally connected at one end to the ring 160 and at the other to the slides 144, 144'. Each link 162, 164 actuates a slide 144, 144' for accomplishing the cutoff operation on both sets of terminal strips. The links 162, 164 extend from the ring 160 in a downward direction. As a consequence, downward motion of the link 158 will result in outward cutting action of the slides 144, 144'. Contrarywise, upward motion of the link 158 causes withdrawal of the slides.

A clamping block 166 is provided on the outer end of each of the slides for clamping engagement of the severed terminal during a cut-off operation. As will be noted, the block 166 is positioned beneath the cutting blade 124 so that it will engage the severed terminal. A rod 168 extends from the block 166 into an opening in the slide. A stop member 170 is provided in an interior recess to limit travel of the block 166. A spring 172 biases the block 166 outwardly. Compression of the spring permits movement of the slide after the block 166 has engaged the terminal to be severed. The function of the block 166 is to clamp the severed terminal in place so that it will not fall immediately after it is severed. Clamping of this terminal at the point of cutoff prevents cocking of the terminal in a manner which would prevent it from falling clearly and straight after the cut-off operation.

After the terminals of each set of terminal strips have been severed, the slides 144, 144' are retracted. After disengagement of the clamping blocks, the terminals fall freely into sets of drop tubes 174, 176 provided directly beneath the terminal strips. A feature of the invention is that the terminal strips are fed axially into the cut-off mechanism and axially into the drop tubes. Each set of drop tubes is mounted in a support structure 178. As will be noted, the lower portions of the drop tubes converge towards each other and terminate in parallel vertically oriented terminal portions which feed the terminals into the terminal positioning and clamping structure 72.

TERMINAL POSITIONING AND CLAMPING STRUCTURE

Figure 5:
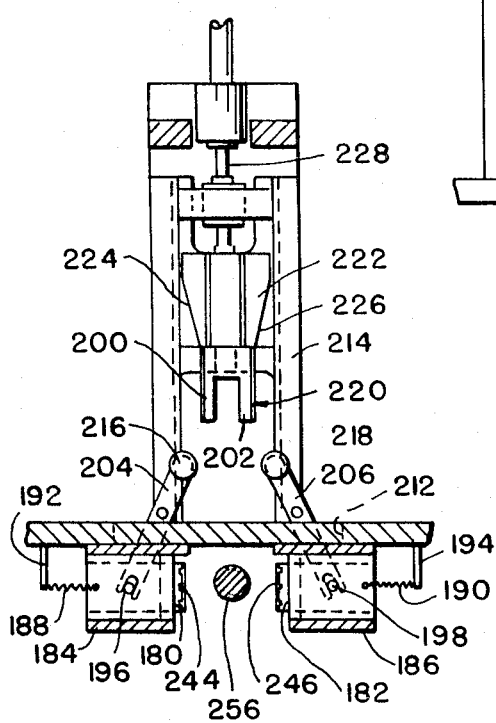
FIG. 5 is a sectional view of the terminal positioning structure taken substantially along the line 5—5 of FIG. 1 looking in the direction of the arrows.
Figure 14:
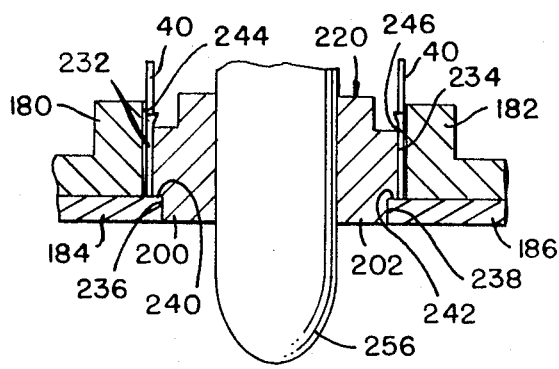
FIG. 14 is a view illustrating the positioning of terminals in the bobbin lugger.

As best illustrated in FIGS. 1, 2, 4, 5, 14 and 15, the terminals are received from the drop tubes and are positioned and clamped in place preparatory to the insertion of a bobbin 12 thereon. The positioning structure is best shown in FIGS. 2, 5 and 14. A pair of opposed positioning blocks 180, 182 are slidably mounted in guide structures 184, 186 which are mounted on the plate 80. A spring 188, 190 is connected between each guide block and a post 192, 194. The springs 188, 190 normally bias the blocks 180, 182 to the open position illustrated in FIG. 5. A pin 196, 198 extends upwardly from each block. A lever 204, 206 having a slot in the forward end thereof engages the pins. The levers extend from the pins 196, 198 through an opening 212 in the plate 80 and converge towards each other. Each of the levers is pivotally mounted intermediate its ends on a guide structure 214 which extends rearwardly from the plate 80. A cam follower 216, 218 is provided on the end of each of the levers 204, 206.

A fork-shaped positioning member 220 is slidably received in the guide structure 214 for reciprocation towards and away from the blocks 180, 182. The positioning member 220 has, at its forward end, a pair of spaced apart elements 200, 202. An enlarged portion 222 having diverging cam surfaces 224, 226 extends rearwardly from the elements 200, 202. A piston rod 228 of pneumatic cylinder 230 is connected to the portion 222 for driving the member 220. When the piston rod 228 is extended, the elements 200, 202 pass by the cam followers 216, 218. The followers subsequently contact the cam surfaces 224, 226. This causes the levers 204, 206 to pivot and move the blocks 180, 182 towards each other. At the end of piston travel, the elements 200, 202 are positioned between the blocks 180, 182 with the surfaces 232, 234 in abutment with the opposed faces of the blocks and notches 236, 238 resting on the shelf portions 240, 242. The elements 200, 202 pass around a bobbin positioning mandrel 256.

As will be noted in FIG. 5, each of the blocks is provided with three spaced apart notches 244, 246 in the opposed faces thereof. These notches define, with the surfaces 232, 234 of the center positioning member, pockets for the reception of the terminals which fall through the drop tubes. As will be appreciated from the structure shown in FIGS. 14 and 15, the terminals will fall freely from the drop tubes 176, 174 into the pockets defined by the positioning structure with the upper portion thereof extending from the positioning structure for subsequent clamping. The blocks 180, 182 and center positioning member 220 are moved into the position illustrated in FIG. 14 just prior to severing of the terminals 40 from the terminal strips.

The terminal clamping structure is provided just above the positioning structure. The upper ends of the terminals 40 are clamped after the terminals have been received and positioned. As best shown in FIGS. 1, 2, 4 and 15, the clamping structure includes a pair of oppositely disposed clamping blocks 248, 250 which are slidably received in guide structure 252. A center clamping member 254 is suspended between the clamping blocks 248, 250 by means of the mandrel 256. The mandrel 256 is affixed to support structure 258 which is mounted on the front face of plate 80.

The clamping blocks 248, 250 are moved in and out of clamping engagement with the terminals by means of a pneumatic cylinder 260 which is mounted on support structure 262 extending from the rear of plate 80. The piston rod 264 of the cylinder 260 is pivotally connected, at its outer end, to a pair of links 266, 268. As will be noted in FIG. 4, when the rod 264 is extended to bring the blocks 248, 250 into clamping engagement with the terminals, the links 266, 268 extend substantially parallel to the plate 80 leaving a space 270 therebetween. The space 270 permits subsequent downward movement of a bender plunger. A pair of levers 272, 274 are pivotally connected to the outer ends of the links 266, 268. The levers are pivotally mounted to the guide structure 252 by means of pivot pins 276, 278 intermediate the ends thereof. A slot 280, 282 is provided in the free end of each of the levers 272, 274 to engage pins 284, 286 which extend upwardly from the clamping blocks 248, 250.

In operation, retraction of the piston rod 264 causes the levers 272, 274 to pivot in directions to move the clamping blocks 248, 250 away from the center clamping member 254 to disengage the terminals. The terminals are engaged by extension of the rod 256 whereupon the levers 272, 274 will pivot in the opposite direction. As will be noted in FIG. 4, the center clamping member 254 has three spaced apart teeth 288, 290 on opposite faces thereof. These teeth are received in aligned notches 292, 294 provided in the oppositely disposed faces of the clamping blocks 248, 250 to thereby engage the terminals.

BOBBIN LOADING AND ELEVATING STRUCTURE

After the terminals have been clamped, the positioning structure is retracted thus exposing the lower portions of the terminals. A bobbin 12 is then elevated from a position beneath the terminals up to the clamping structure whereupon the terminals will be inserted into the openings 24, 26 of the bobbin with the portion 68 extending out of the lower end of the bobbin.

The bobbin loading and elevating structure 74 and the elevating of a bobbin are best seen in FIGS. 1, 2, 6, and 16. A table 296 is provided at the lower end of the plate 80 and supported by structure 298. A pneumatic cylinder 300 is mounted on the table 296. The piston rod 302 extends into a housing 304 and is guided therein. A bobbin loading magazine 306 is provided forwardly of the housing 304. A plurality of bobbins are loaded in the magazine 306 with the flange structure 16 lowermost. The lowermost bobbin is received in guide structure 308 provided in front of the housing 304. Actuation of the cylinder 300 causes the rod 302 to be extended and contact the lowermost bobbin. The bobbin is moved forwardly out of the guide 308 and onto an elevator platform 310. The bobbin is driven to the rearmost position on the elevator for proper positionment to align the bobbin openings with the terminals which are clamped in place thereabove. The bobbin flange structure 16 is received in notches 312, 313 provided in spaced apart bars 314, 316 which are secured to the platform 310. The platform 310 has sidewardly extending slide elements 318, 320 which are received in spaced apart guide members 322, 324.

Figure 15:
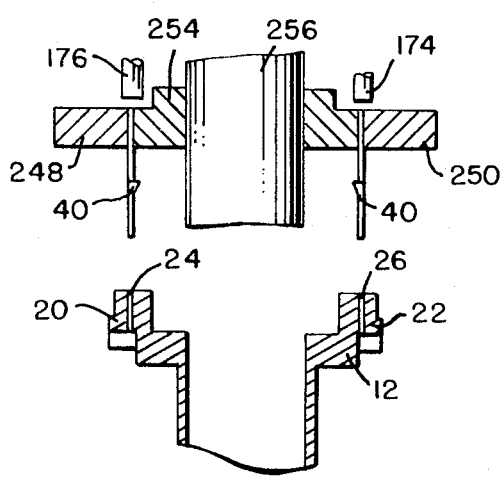
FIG. 15 is a view illustrating the clamping of terminals in the bobbin lugger and advancing of a bobbin towards the terminals.
Figure 6:
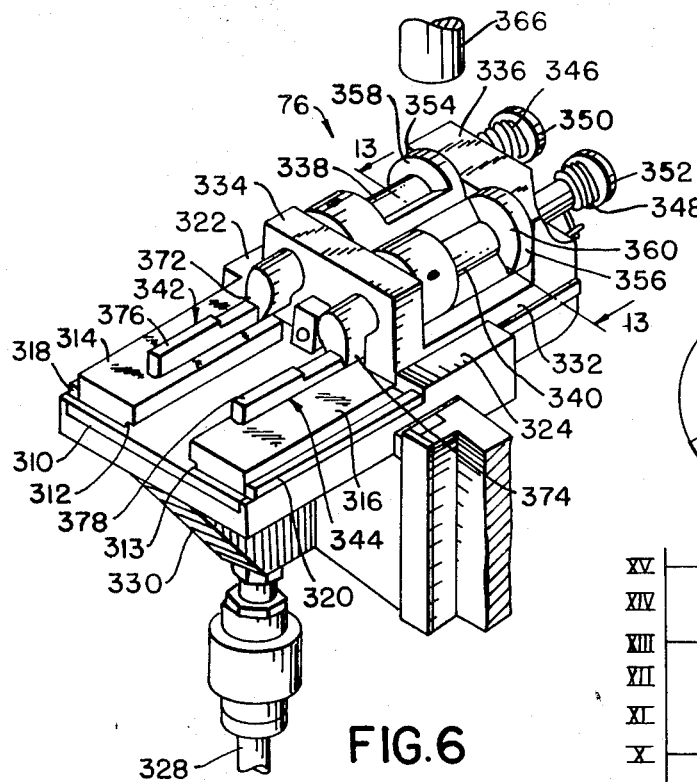
FIG. 6 is a view in perspective of the terminal bending and bobbin elevator structure.
Figure 13:
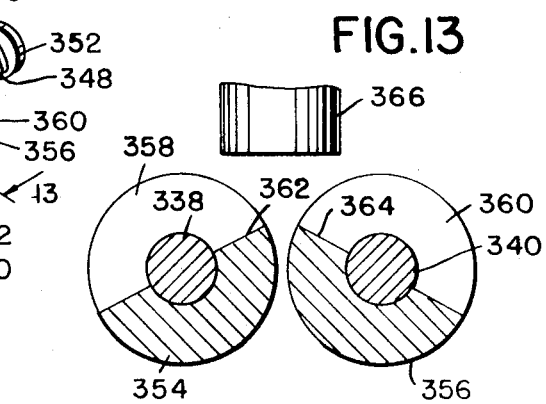
FIG. 13 is a sectional view of the terminal bender taken substantially along the line 13—13 of FIG. 6 looking in the direction of the arrows.
Figure 16:
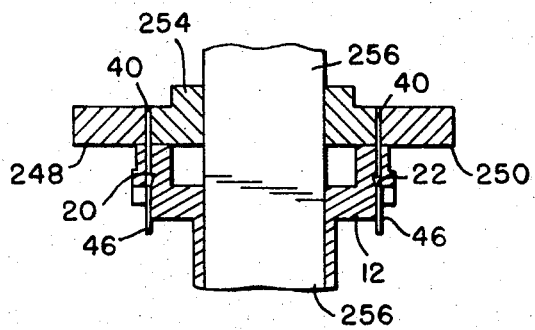
FIG. 16 is a view illustrating insertion of the terminals into the bobbin.

A pneumatic cylinder 326 is provided beneath the elevator platform 310. The piston rod 328 of the cylinder 326 is secured to bracket structure 330 which is mounted on the under side of the platform 310. The cylinder 326 is a double cylinder and is utilized both for elevating an unlugged bobbin and for ejecting a lugged bobbin. After the bobbin has been loaded onto the platform 310, the cylinder structure 326 is actuated causing the platform to be raised and the clamped terminals 40 to be inserted into the openings 24, 26, with the portions 46 extending out of the terminal receiving portions 20, 22 as illustrated in FIGS. 15 and 16. The mandrel 256 extends through the cylindrical portion 14 to exactly position the bobbin 12 for reception of the terminals 40. The assembly is, at this point, prepared for the bending operation.

TERMINAL BENDING STRUCTURE

The terminal bending structure is best illustrated in FIGS. 1, 2, 6, 13, 17 and 18. As will be noted, the terminal bending structure 76 is secured to the platform structure 310 and is elevated therewith. The terminal bending structure 76 includes a U-shaped mounting block 332 having upstanding walls 334, 336. A pair of aligned openings are provided in each wall 334, 336 for the reception of cylindrical portions 338, 340 of bending bars 342, 344. The rearward ends of the bars 342, 344 extend beyond the wall 336. A torsion spring 346, 348 is provided on the end of each bar 342, 344. One end of each spring is connected to the wall 336. The other end is connected to a collar 350, 352 secured to the outer ends of the bars. The springs normally bias the bending bars to the position shown. The bars may, however, be pivoted to perform the desired bending operation.

A collar 354, 356 is secured to the cylindrical portions 338, 340 between the walls 334, 336. Each collar has a cut-out portion 358, 360 which defines a pair of oppositely disposed flat surfaces 362, 364. These surfaces are contacted by a plunger element 366 to cause pivoting of the bending bars to wipe exposed portions of the terminals 40 in the desired bending action. When the plunger element 366 is retracted, the springs 346, 348 cause the bending bars to be returned to the position illustrated in FIGS. 6 and 13. The plunger element 366 is secured to the lower end of piston rod 368 of pneumatic cylinder 370 (FIG. 2). The cylinder 370 is mounted on the rear face of the plate 80. As previously mentioned, when the terminals are clamped, the clamping linkage defines the space 270 which permits insertion of the plunger element thereby. Actuation of the cylinder 370 causes the rod and plunger to be driven downwardly to pivot the bars 342, 344. Retraction of the rod 368 results in the bars being returned to the normal position.

The forward ends of the cylindrical portions 338, 340 extend out of the wall 334. A radially outwardly extending projection 372, 374 is provided on the outer ends of the cylindrical portions. Wiping bars 376, 378 extend from the projections 372, 374 in parallel relationship. The bars 376, 278 are spaced apart a distance to pass around the cylindrical portion 14 and fit into the recess defined by the bobbin flange structures 16, 18. A wiping surface 380, 382 is provided on each wiping bar. As will be noted, the portions 46 of the terminals which are to be bent are positioned outside of the wiping bars 376, 378 adjacent to the wiping surfaces 380, 382. When the bending bars 342, 344 are pivoted by means of the plunger element 366, the wiping surfaces 380, 382 describe an arc about the longitudinal axis of the cylindrical portions 338, 340 to contact the terminal portions 46 and cause these portions to be bent outwardly at substantially right angles to the remainder of the terminals. The terminal will bend at the fulcrum point 36, 38 because the sharp edge thereof impinges directly upon the narrow section 56 of the exposed terminal portions.

BOBBIN RETRACTING AND EJECTING STRUCTURE

After the terminals have been bent, the plunger element 366 is retracted and the clamping structure is actuated to release the now lugged bobbin. The cylinder structure 326 is then actuated to retract the piston rod 328 and lower the platform 310. As previously indicated, the cylinder structure 326 is a double cylinder. In the retracting sequence, both cylinders are completely retracted. This causes the platform 310 to be lowered to a position as shown in FIG. 19 which is below the position illustrated in FIG. 2.

Figure 19:
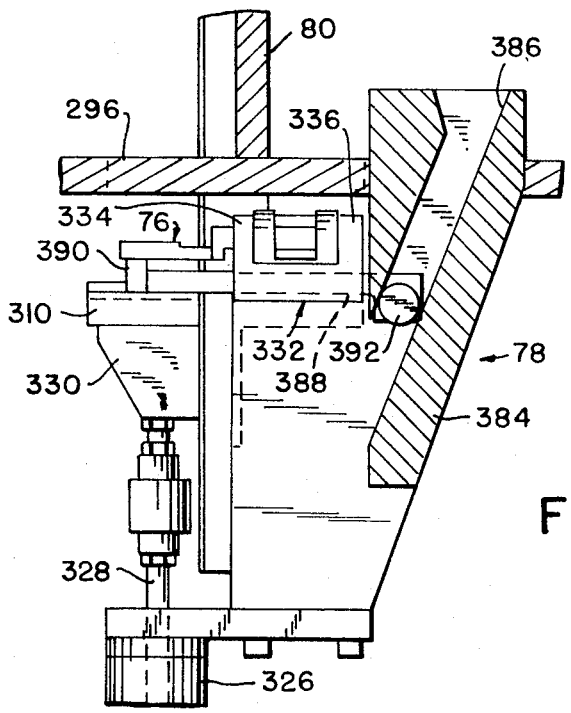
FIG. 19 is a view illustrating the lower portion of the bobbin lugger showing the bobbin ejection structure with parts broken away for the purpose of clarity.

The bobbin retracting and ejecting structure 78 includes a cam device which, when the platform 310 is lowered to the position illustrated in FIG. 19, causes the lugged bobbin to be ejected. The cam structure includes a cam plate 384 which is fixedly mounted on the table structure. The cam plate 384 includes a cam track 386 which is angled downwardly and forwardly towards the lugged bobbin. An ejector arm 388 is slidably mounted on the platform 310. The arm 388 extends through aligned openings provided in the walls 334, 336 of the U-shaped block 332. An ejector plate 390 is secured to the end of the arm 388 on the exterior side of wall 334. The ejector arm 388 is provided, at the other end, with a cam follower 392 which rides in the cam track 386. Upon lowering of the platform 310 downwardly to the position illustrated in FIG. 17, the arm 388 is cammed forwardly. The ejector plate 390 contacts the lugged bobbin and drives it out of position whereupon it is retrieved and stored.

CONTROL MECHANISM

Figure 12:
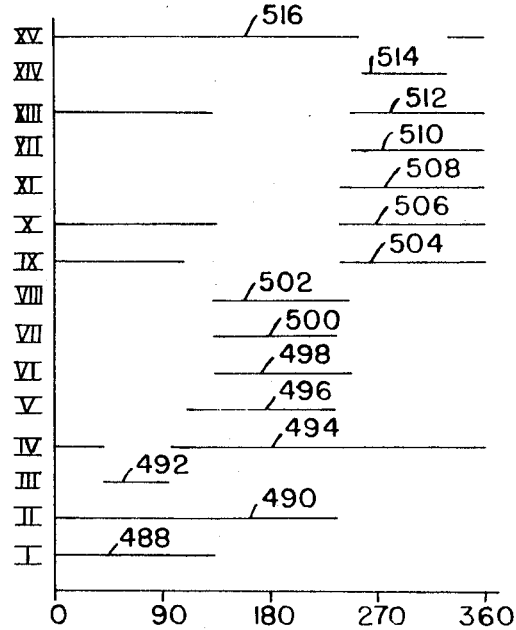
FIG. 12 is a chart illustrating the sequence of operation of the bobbin lugger.

FIGS. 10, 11 and 12 illustrate the control mechanism for sequentially operating the bobbin lugger 10. FIG. 10 is an electrical schematic illustration of the circuitry for actuating the various pneumatic cylinders. A plurality of switches are arranged in parallel across a source of power 394. These switches are, in practice, actuated by means of a cam device of the conventional type which may be a plurality of rotary cam devices having tracks on which mechanical switch actuators ride. Such cam devices are rotated at a timed rate. The tracks include high and low spots, the high spots causing actuation of the associated switch in one direction and the low spots causing the reverse to occur. The length of the high and low spots determines the length of time that the switch will dwell in a given position.

Nine switches 396, 398, 400, 402, 404, 406, 408, 410, 412 are provided in parallel between leads 414, 416 which are connected to the source of power 394 by lead 418. An on-off main switch 420 is provided in lead 414 to energize the circuit.

The first switch 396 is a double throw switch which in one position closes lead 422 to power and in the other position closes lead 424 to power. A solenoid coil 426 is provided in lead 422 and a solenoid coil 428 is provided in lead 424. These coils are provided in solenoids which actuate air valve 430 (FIG. 11) to one of two positions. As will be noted in FIG. 11, the valve 430 actuates the cylinders 114, 115 to extend or retract the respective pistons. The cylinders 114, 115 are the power source for the feed fingers 108, 109. A plurality of valves are provided for actuation of the various cylinders and each is substantially the same as valve 430. The valve 430 is a two position valve. Energization of one of the coils 426 causes the valve to assume a position where air under pressure is supplied to the driving end of cylinders 114, 115 to cause extension of the piston rods. Energization of the other coil 428 causes the valve to assume the second position whereupon air under pressure is supplied to the forward end of the cylinders causing retraction of the piston rods. When air under pressure is applied to one side of the cylinder pistons, the space on the other side of the pistons is vented to atmosphere through metering valves 432, 434. These valves control the rate at which the piston rods move. As will be noted, the switch 396 is, at the beginning of a cycle, in a position to close the circuit through the coil 428 in which case the pistons of cylinders 114, 115 are retracted.

The three single throw switches 398, 400, 402 control energization of the coils 436, 438, 440, 442 which form part of solenoid actuated air valves 444, 446. The valves 444, 446 control actuation of the double cylinder 326. As will be noted, the switch 398 is normally closed, thus causing energization of the coil 436. This coil is effective to cause air valve 444 to supply air under pressure to the driving side of the piston 448 of double cylinder 326 thus raising the platform 310 to a position for loading of a bobbin as in FIGS. 1 and 2. The coil 438 is deenergized at the start of a cycle because the switch 400 is open. The coil 438 is effective, when energized, to cause the valve 446 to supply air under pressure to the driving side of the second piston 450 of the double cylinder 326 to elevate the platform and raise the bobbin to the clamped terminals. The coils 440, 442 which are provided in parallel leads 452, 454 are deenergized at the start of the cycle. Closure of switch 402 results in energization of these coils with resultant retraction of both pistons to cause ejection of a lugged bobbin.

Switch 404 controls energization of coils 456, 458 which actuate valve 460 to control operation of the bobbin loader cylinder 300. Switch 406 controls energization of coils 462, 464 which actuate valve 466 to control the terminal bender cylinder 370.

Switch 408 controls energization of coils 468, 470 which actuate valve 472 to control the terminal positioner cylinder 230. Switch 410 controls energization of coils 474, 476 which actuate valve 478 to control the terminal cut-off cylinder 148. Finally, switch 412 controls energization of coils 480, 482 which actuate valve 484 to control the terminal clamping structure cylinder 260. It will be noted that a central pressure fluid source 486 is provided to supply air under pressure to the various valves. The power means for operation of the various structures in the invention have been described as pneumatic devices. However, it will be appreciated that other power techniques, such as hydraulic devices or electrically operated means, may also be used in accordance with the invention.

FIG. 12 is a graph illustrating the sequential operation of the various components of the bobbin lugger 10. The abscissa is marked off in circular degrees, representing one complete revolution of the operating cams. These degrees are directly related to time. The solid horizontal lines, which are sequentially numbered from one through fifteen on the ordinate, represent the circular degrees or length of time during which the various coils are energized. Energization of the coils, of course, relates directly to the retracting and extending movement of the various pistons.

The cycle is, in practice, begun with a bobbin loaded on the platform 310 and with terminals 40 clamped in position ready for insertion of the bobbin thereon. This is done because, as a practical matter, the operator of the bobbin lugger can be sure that the machine is ready for actuation if he can visually observe that a bobbin is in place. Upon initiation of a cycle, the solenoid coil 438 is energized thus elevating the platform 310 up to the terminals 40 to engage the bobbin with the terminals which are hanging vertically in the clamping structure at this time. This step is indicated by the numeral I. The length of time of energization of the coil 438 is indicated by the solid line 488. Approximately simultaneously with energization of the coil 438, the terminal feed mechanisms are advanced by energization of the coil 426. This is indicated at position II by line 490.

Figure 17:
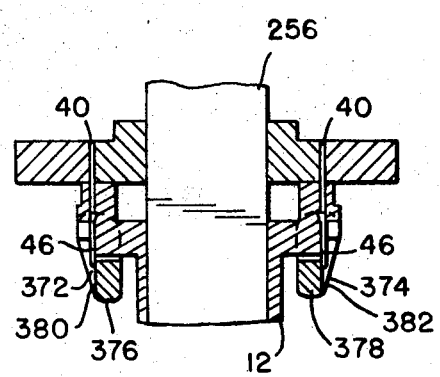
FIG. 17 is a view illustrating the first stage of bending of the terminals in the bobbin.
Figure 18:
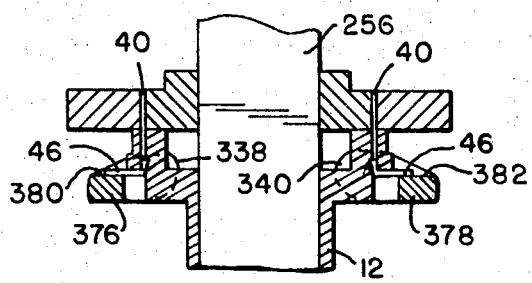
FIG. 18 is a view illustrating the final stage of terminal bending.

After the bobbin has been elevated, the bender-plunger 366 is advanced to pivot the bending bars 342, 344 in the manner illustrated in FIGS. 17 and 18 to bend the terminal portions 46. This is accomplished by energization of the coil 462 and is represented at position III by line 492. After bending, the plunger 366 is immediately retracted by energization of coil 464 represented at position IV by line 494. The terminal clamps 248, 250 are then retracted from engagement with the terminals 40 as a result of energization of the coil 482 as indicated at position V by line 496. The platform 310, carrying the lugged bobbin, then descends to the platform illustrated in FIG. 19 whereupon the lugged bobbin is ejected. This is accomplished by energization of coils 440, 442 as indicated at position VI by line 498. At substantially the same time, the terminal cut-off blade 124 is advanced to sever the next terminal 40 by energization of the coil 474 and the terminal positioning structure is actuated to form the desired terminal receiving pockets by energization of the coil 468 as indicated at positions VII and VIII by lines 500, 502.

The terminal clamping structure then is again actuated by energization of the coil 482 to cause engagement of the new terminals. This is represented at position IX by line 504. At this time, the terminal cut-off structure is retracted and the feed fingers 108, 109 are retracted to a position to engage the terminal strip 42 to advance a new terminal into place by energization of the coils 476, 428, as indicated at positions X and XI by lines 506, 508.

The platform 310 is then advanced back to the position illustrated in FIGS. 1 and 2 by energization of the coil 436 as indicated in position XII by line 510. At this time, the terminal positioning structure is also retracted by energization of the coil 470 as indicated at position XIII by line 512. A new bobbin is then loaded onto the platform 310 by energization of the coil 456, the piston 302 being immediately retracted thereafter by energization of the coil 458 as indicated at positions XIV and XV by lines 514, 516. It will be appreciated, in the above discussion, that when one coil is energized its counterpart is deenergized as the result of the switching arrangement illustrated in FIG. 10.

What I claim as my invention is:

1. A bobbin lugger for mounting a plurality of terminals on a bobbin having a plurality of terminal receiving openings comprising means for feeding a plurality of chain forms of terminals, means for severing terminals one at a time from said chain forms, a terminal positioning structure for aligning the severed terminals in a position for insertion into the openings of the bobbin, means for advancing the severed terminals to the terminal positioning structure, means for clamping the terminals while the terminals are aligned in the terminal positioning structure, means for removing the terminal positioning structure to expose a portion of the clamped terminals, means for relatively moving a bobbin onto the clamped terminals whereby the exposed portions thereof extend through the bobbin openings with the sections thereof extending out of the bobbin openings, and means to bend said sections to lock the terminals onto the bobbin.

2. A bobbin lugger as defined in claim 1, and further characterized in that the terminal positioning structure comprises at least two relatively movable elements, power means for moving said elements into a position where adjacent faces thereof are in abutment, at least one of said elements having a plurality of slots in the abutting face thereof to form pockets for the reception of severed terminals for alignment thereof in a position for insertion into the openings of the bobbin, each pocket being of less depth than the length of a terminal whereby portion of a terminal received therein will extend thereout for subsequent clamping.

3. A bobbin lugger as defined in claim 2, and further characterized in the provision of three positioning elements, one of the positioning elements being a center element, each of the other two positioning elements being end elements, each of the end elements being located on one side of the center element, means for moving said center element to a position between the end elements, and means for moving said end elements towards said center element when the center element is positioned therebetween whereby adjacent faces of the end and center elements are in abutment, each pair of abutting faces being provided with said slots to form said terminal receiving pockets.

4. The bobbin lugger as defined in claim 3, and further characterized in that said center element travels in a path at substantially right angles to the path of travel of the end elements, whereby all three of the elements may be removed from clamped terminals to expose a portion of the terminals for insertion into a bobbin.

5. A bobbin lugger as defined in claim 4, and further characterized in that the power means drives said center element, said center element having a cam surface on each side thereof, each of said end elements being provided with cam follower means for engagement with said cam surfaces to move the end elements into abutment with the center element when the center element is moved therebetween.

6. A bobbin lugger as defined in claim 5, and further characterized in that the means for removing the terminal positioning structure comprises the power means for moving the center element, and spring means attached to each end element, said spring means biasing the end elements away from abutment with the center element.

7. A bobbin lugger as defined in claim 2, and further characterized in that said slots are vertically oriented, said means for advancing the severed terminals to the terminal positioning structure comprising vertically oriented guide tubes, each guide tube extending from the means for severing the terminals into registry with one of the pockets defined by the slots and abutting surface in the positioning structure to receive severed terminals and gravity-feed them into said pockets.

8. A bobbin lugger as defined in claim 7, and further characterized in that said means for feeding a plurality of chain forms of terminals comprises generally vertically oriented guide structure positioned above said guide tubes and having guide tracks in alignment with the tubes for feeding the chain forms axially toward the tubes, said means for severing terminals one at a time from said chain forms being positioned between the chain form guide structure and the guide tubes.

9. A bobbin lugger as defined in claim 1, and further characterized in that the means for clamping one end of the terminals while the terminals are in the terminal positioning structure comprise at least two relatively movable clamping elements, said clamping elements having opposed tooth structures for intermeshing engagement with one end of each terminal, and power means to relatively move said clamping elements into and out of intermeshing engagement.

10. A bobbin lugger as defined in claim 3, and further characterized in that said means for clamping one end of the terminal while the terminals are in the terminal positioning structure comprises three clamping elements, one of said clamping elements being a center clamping element, each of the other clamping elements being an end clamping element, said center and end clamping elements having tooth structures on the opposed faces thereof for intermeshing engagement with the outwardly extending ends of the terminals, and power means to relatively move the center and end clamping elements into meshing engagement.

11. A bobbin lugger as defined in claim 10, and further characterized in that the center clamping element is fixed, said power means actuating said end clamping elements into and out of meshing engagement with the center clamping element.

12. A bobbin lugger as defined in claim 1, and further characterized in that the means to bend said sections to lock the terminals onto the bobbins comprise at least one pivotally mounted bending bar, said bending bar having a wiping surface adjacent to said terminal sections when the bobbin is moved onto the clamped terminals, and means to pivot said bending bar in an arc for engagement of the wiping surface thereof with said terminal sections to bend said sections about the bobbin.

13. A bobbin lugger as defined in claim 3, and further characterized in that the means to bend said sections to lock the terminals onto the bobbin comprise a pair of spaced apart pivotally mounted bending bars, said bending bars being receivable between terminals which have been clamped in positions determined by the pockets of each pair of abutting faces of the three positioning elements, each of said bending bars having a wiping surface adjacent to opposed terminal sections, and means to pivot said bending bars in arcs for engagement of the wiping surfaces thereof with the adjacent terminal sections to bend said sections about the bobbin.

14. A bobbin lugger as defined in claim 12, and further characterized in that the means to pivot said bending bar in an arc includes a plunger, power means to extend said plunger towards the bending bar and retract it away from the bending bar, a surface on the bending bar in alignment with the plunger for engagement therewith at a point radially outwardly from the pivot axis of the bending bar upon extension of the plunger to thereby result in pivoting of the bending bar to bend said sections, and torsion spring means attached to the bending bar, said spring means biasing the bending bar in an opposite arc upon retraction of the plunger.

15. A bobbin lugger as defined in claim 14, and further characterized in that the means for relatively moving a bobbin onto the clamped terminals comprises a platform including means for positioning the bobbin with the openings thereof in alignment with clamped terminals, power means for moving the platform onto clamped terminals, said bending bars being mounted on the platform for movement therewith.

16. A bobbin lugger as defined in claim 15, and further characterized in that said mentioned power means is effective to retract the platform after a bobbin has been lugged, and ejector means operative at the terminus of retraction of the platform to eject a lugged bobbin.

17. A bobbin lugger as defined in claim 16, and further characterized in the provision of loading means operative to load an unlugged bobbin onto the platform after ejection of a lugged bobbin.

18. A bobbin lugger for mounting a plurality of terminals on a bobbin having a plurality of terminal receiving openings comprising terminal positioning and clamping means positioned along a work path, holding means for maintaining a bobbin in fixed orientation with the terminal receiving openings in alignment with the work path, means for severing terminals from the ends of terminal chains, chute means for receiving and advancing severed terminals along a feed path to the positioning and clamping means, said last mentioned means being operative to receive and clamp said terminals in positions in alignment with the terminal receiving openings of a bobbin in the holding means, drive means for moving said holding means along said work path for insertion of the terminals through the bobbin openings, and means to deform a section of the terminals after insertion thereof into a bobbin to attach the terminals thereto.

19. A bobbin lugger as defined in claim 18 and further characterized in that the terminal positioning means comprises at least two relatively movable elements, power means for moving said elements into a position where adjacent faces thereof are in abutment, at least one of said elements having a plurality of slots in the abutting face thereto to form pockets for the reception of severed terminals for said longitudinal alignment, said pockets being of less depth than the length of a terminal whereby one end of a terminal received therein will extend thereout for clamping.

20. A bobbin lugger as defined in claim 19, and further characterized in that said clamping means comprises, at least two relatively movable clamping elements, said clamping elements having opposed tooth structures for intermeshing engagement with said extending end of each terminal, and power means to relatively move said clamping elements into and out of intermeshing engagement.

21. A bobbin lugger as defined in claim 20, and further characterized in the provision of power means effective to remove the terminal positioning elements after the terminals have been clamped.

22. The method for attaching terminals to bobbins comprising the steps of moving a bobbin having a plurality of terminal receiving openings therein from a loading station to a terminal lugging station, positioning and then clamping a plurality of terminals in alignment with the bobbin openings, inserting the terminals through the bobbin openings with a portion thereof extending out of the bobbin openings, pivoting a bender bar into engagement with the portions of the terminals extending out, of the bobbin and bending these portions at substantially right angles to the portions within the bobbin along a fulcrum point defined by the mouths of the bobbin openings, unclamping the terminals, then withdrawing the now lugged bobbin back to the loading station, then unloading the lugged bobbin, then positioning and clamping a new set of terminals at the terminal lugging station in alignment with the bobbin openings and loading a new bobbin at the loading station.

23. In a method for positioning and clamping a plurality of terminals for insertion into openings of a bobbin, the steps of forming a plurality of vertical oriented terminal receiving pockets arranged in alignment with the openings of a bobbin, simultaneously gravity feeding a terminal into each pocket with an end of each terminal extending upwardly and outwardly of its pocket, simultaneously clamping all of said terminal ends, and then removing the pockets to expose the lower portion of each terminal for insertion into a bobbin opening.

References Cited
UNITED STATES PATENTS

| | | | |
|---|---|---|---|
| 2,814,812 | 12/1957 | Maximoff | 29—203 BX |
| 2,867,810 | 1/1959 | Gagnon et al. | 29—203 B |
| 3,409,972 | 11/1968 | Cervanka et al. | 29—203 D |
| 3,524,240 | 8/1970 | Walker et al. | 29—203 B |
| 3,561,114 | 2/1971 | Thoms et al. | 29—630 |
| 3,562,903 | 2/1971 | Le Roy Busler et al. | 29—602 |
| 3,574,935 | 4/1971 | Berg | 29—626 |
| 3,550,250 | 12/1970 | Cernanka et al. | 29—429 |

THOMAS H. EAGER, Primary Examiner

U.S. Cl. X.R.

29—203 B, 203 D

UNITED STATES PATENT OFFICE
CERTIFICATE OF CORRECTION

Patent No. __3,616,534__    Dated __November 2, 1971__

Inventor(s) __Richard W. Black__

It is certified that error appears in the above-identified patent and that said Letters Patent are hereby corrected as shown below:

Claim 22, line 13, delete "now"; and
lines 13, 14 and 15, delete "then".

Signed and sealed this 18th day of April 1972.

(SEAL)
Attest:

EDWARD M. FLETCHER, JR.
Attesting Officer

ROBERT GOTTSCHALK
Commissioner of Patents